US006269412B1

(12) United States Patent
Liu et al.

(10) Patent No.: US 6,269,412 B1
(45) Date of Patent: Jul. 31, 2001

(54) APPARATUS FOR RECORDING INFORMATION SYSTEM EVENTS

(75) Inventors: Ji-hwan Liu, Cupertino; Ken Nguyen, San Jose; Karl S. Johnson, Palo Alto, all of CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 08/942,381

(22) Filed: Oct. 1, 1997

Related U.S. Application Data

(60) Provisional application No. 60/046,397, filed on May 13, 1997, provisional application No. 60/047,016, filed on May 13, 1997, and provisional application No. 60/046,416, filed on May 13, 1997.

(51) Int. Cl.[7] .................................................. G06F 11/34

(52) U.S. Cl. .............................. 710/19; 710/15; 702/187; 714/39

(58) Field of Search ................................. 714/47, 45, 57, 714/39, 4, 15, 18, 20, 43, 56, 49; 713/502, 340; 710/15, 19; 702/187

(56) References Cited

U.S. PATENT DOCUMENTS

| 2,261,094 | 11/1941 | Everson et al. ....................... 395/600 |
| 4,100,597 | 7/1978 | Fleming et al. ...................... 364/474 |
| 4,449,182 | 5/1984 | Rubinson et al. .................... 364/200 |
| 4,692,918 | 9/1987 | Elliott et al. ............................ 370/85 |
| 4,695,946 | 9/1987 | Andreasen et al. ................... 364/200 |
| 4,707,803 | 11/1987 | Anthony, Jr. et al. ............... 364/900 |
| 4,774,502 | 9/1988 | Kimura ................................. 340/501 |
| 4,821,180 | 4/1989 | Gerety et al. ........................ 364/200 |
| 4,835,737 | 5/1989 | Herrig et al. . |
| 4,894,792 | 1/1990 | Mitchell et al. ...................... 364/708 |
| 4,949,245 | 8/1990 | Martin et al. ........................ 364/200 |

(List continued on next page.)

FOREIGN PATENT DOCUMENTS

| 0 866 403 A1 | 9/1998 | (EP) | .............................. G06F/13/10 |
| 05 233 110 | 9/1993 | (JP) | .................................. G06F/3/00 |
| 07 093 064 | 4/1995 | (JP) | .................................. G06F/1/26 |
| 07 261 874 | 10/1995 | (JP) | .................................. G06F/1/18 |

OTHER PUBLICATIONS

Haban, D. & D. Wybranietz, *IEEE Transaction on Software Engineering*, 16(2):197–211, Feb. 1990, "A Hybrid Monitor for Behavior and Performance Analysis of Distributed Systems."

Standard Overview, http://www.pc–card.com/stand$_{13}$ overview.html#1, p pages, Jun. 1990, "Detailed Overview of the PC Card Standard."

Digital Equipment Corporation, datasheet, 140 pages, 1993, "DECchip 21050 PCI–TO–PCI Bridge."

NetFRAME Systems Incorporated, New Release, 3 pages, referring to May 9, 1994, "NetFRAME's New High–Availability ClusterServer Systems Avoid Scheduled as well as Unscheduled Downtime."

Compaq Computer Corporation, Phenix Technologies, LTD, and Intel Corporation, specification, 55 pages, May 5, 1995, "Plug & Play BIOS Specification."

(List continued on next page.)

Primary Examiner—Thomas Lee
Assistant Examiner—Ilwoo Park
(74) Attorney, Agent, or Firm—Knobbe, Martens Olson & Bear LLP (57) ABSTRACT

A system recorder for logging events occurring in an information processing system in a memory unit. The system recorder is part of a server system which supports communication of digital information for a microcontroller network. The server system monitors the status of several system functions including temperature, cooling fan speeds, and the presence or absence of canisters and power supplies. The system updates the pertinent event messages and identification codes in the memory unit including the time such event or change in status occurred.

23 Claims, 6 Drawing Sheets

U.S. PATENT DOCUMENTS

| | | | |
|---|---|---|---|
| 4,968,977 | 11/1990 | Chinnaswamy et al. | 340/825.8 |
| 4,999,787 | 3/1991 | McNally et al. . | |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,123,017 | 6/1992 | Simpkins et al. | 371/15.1 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,210,855 | 5/1993 | Bartol | 395/500 |
| 5,222,897 | 6/1993 | Collins et al. | 439/157 |
| 5,245,615 | 9/1993 | Treu | 371/16.5 |
| 5,247,683 | 9/1993 | Holmes et al. | 395/700 |
| 5,269,011 | 12/1993 | Yanai et al. . | |
| 5,272,382 * | 12/1993 | Heald et al. | 307/66 |
| 5,272,584 | 12/1993 | Austruy et al. | 631/58 |
| 5,276,814 | 1/1994 | Bourke et al. | 395/275 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 * | 2/1994 | Saadeh et al. | 395/750 |
| 5,311,397 | 5/1994 | Harshberger et al. | 361/683 |
| 5,311,451 | 5/1994 | Barrett | 364/550 |
| 5,317,693 | 5/1994 | Cuenod et al. . | |
| 5,329,625 | 7/1994 | Kannan et al.. | 395/275 |
| 5,337,413 | 8/1994 | Lui et al. | 395/275 |
| 5,367,670 * | 11/1994 | Ward et al. | 395/575 |
| 5,379,184 | 1/1995 | Barraza et al. | 361/685 |
| 5,379,409 | 1/1995 | Ishikawa | 395/575 |
| 5,386,567 | 1/1995 | Lien et al. | 395/700 |
| 5,388,267 | 2/1995 | Chan et al. | 395/700 |
| 5,402,431 * | 3/1995 | Saadeh et al. | 371/67.1 |
| 5,423,025 | 6/1995 | Goldman et al. | 395/575 |
| 5,426,740 | 6/1995 | Bennett | 395/325 |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,438,678 | 8/1995 | Smith | 395/750 |
| 5,448,723 | 9/1995 | Rowett | 395/200.02 |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,465,349 | 11/1995 | Geronimi et al. | 364/550 |
| 5,471,617 | 11/1995 | Farrand et al. | 395/700 |
| 5,483,419 | 1/1996 | Kaczeus, Sr. et al. . | |
| 5,485,550 | 1/1996 | Dalton | 395/51 |
| 5,485,607 | 1/1996 | Lomet et al. | 395/600 |
| 5,493,574 | 2/1996 | McKinley . | |
| 5,493,666 | 2/1996 | Fitch . | |
| 5,513,314 | 4/1996 | Kandasamy et al. | 395/182.04 |
| 5,513,339 | 4/1996 | Agrawal et al. | 395/500 |
| 5,515,515 | 5/1996 | Kennedy et al. | 395/283 |
| 5,517,646 | 5/1996 | Piccirillo et al. . | |
| 5,519,851 | 5/1996 | Bender et al. | 395/500 |
| 5,533,193 * | 7/1996 | Roscoe | 395/183.15 |
| 5,533,198 | 7/1996 | Thorson | 395/200.15 |
| 5,535,326 | 7/1996 | Baskey et al. | 395/182.02 |
| 5,539,883 | 7/1996 | Allon et al. | 395/200.11 |
| 5,542,055 | 7/1996 | Amini et al. | 395/281 |
| 5,548,712 | 8/1996 | Larson et al. | 395/182.05 |
| 5,555,510 | 9/1996 | Verseput et al. . | |
| 5,560,022 | 9/1996 | Dunstan et al. | 395/750 |
| 5,564,024 | 10/1996 | Pemberton | 395/283 |
| 5,566,299 | 10/1996 | Billings et al. | 395/182.02 |
| 5,566,339 | 10/1996 | Perholtz et al. | 395/750 |
| 5,568,610 | 10/1996 | Brown . | |
| 5,579,487 | 11/1996 | Meyerson et al. | 395/280 |
| 5,579,491 | 11/1996 | Jeffries et al. | 395/283 |
| 5,579,528 | 11/1996 | Register | 395/671 |
| 5,581,712 | 12/1996 | Herrman . | |
| 5,584,030 | 12/1996 | Husak et al. | 395/750 |
| 5,588,144 | 12/1996 | Inoue et al. . | |
| 5,592,610 | 1/1997 | Chittor | 395/182.02 |
| 5,592,611 | 1/1997 | Midgely et al. | 395/182.02 |
| 5,596,711 | 1/1997 | Burckhartt et al. | 395/182.21 |
| 5,602,758 | 2/1997 | Lincoln et al. | 364/505 |
| 5,604,873 | 2/1997 | Fite et al. | 395/283 |
| 5,606,672 | 2/1997 | Wade . | |
| 5,608,865 | 3/1997 | Midgely et al. | 395/180 |
| 5,608,876 | 3/1997 | Cohn et al. | 395/281 |
| 5,615,207 | 3/1997 | Gephardt et al. . | |
| 5,621,892 | 4/1997 | Cook | 395/200.1 |
| 5,625,238 | 4/1997 | Ady et al. | 307/147 |
| 5,627,962 | 5/1997 | Goodrum et al. | 395/182.11 |
| 5,628,028 | 5/1997 | Michelson | 395/825 |
| 5,630,076 | 5/1997 | Saulpaugh et al. | 395/284 |
| 5,631,847 | 5/1997 | Kikinis | 364/514 R |
| 5,632,021 | 5/1997 | Jennings et al. | 395/309 |
| 5,636,341 | 6/1997 | Matsushita et al. | 395/182.11 |
| 5,638,289 | 6/1997 | Yamada et al. | 364/489 |
| 5,644,470 | 7/1997 | Benedict et al. . | |
| 5,644,731 | 7/1997 | Liencres et al. | 395/283 |
| 5,651,006 | 7/1997 | Fujino et al. . | |
| 5,652,832 | 7/1997 | Kane et al. . | |
| 5,652,833 | 7/1997 | Takizawa et al. | 395/182.08 |
| 5,652,839 | 7/1997 | Giorgio et al. | 395/200.11 |
| 5,652,908 | 7/1997 | Douglas et al. | 395/800 |
| 5,655,083 | 8/1997 | Bagley | 395/182.31 |
| 5,664,118 | 9/1997 | Nishigaki et al. | 395/283 |
| 5,664,119 | 9/1997 | Jeffries et al. . | |
| 5,668,943 | 9/1997 | Attanasio et al. | 395/182.05 |
| 5,668,992 | 9/1997 | Hammer et al. | 395/651 |
| 5,669,009 | 9/1997 | Buktenica et al. | 395/800.35 |
| 5,680,288 | 10/1997 | Carey et al. | 361/118 |
| 5,682,328 * | 10/1997 | Roeber et al. | 364/550 |
| 5,696,895 | 12/1997 | Hemphill et al. | 395/182.02 |
| 5,696,949 | 12/1997 | Young | 395/551 |
| 5,696,970 | 12/1997 | Sandage et al. . | |
| 5,701,417 | 12/1997 | Lewis et al. | 395/200.16 |
| 5,704,031 | 12/1997 | Mikami et al. | 395/182.02 |
| 5,708,775 | 1/1998 | Nakamura | 395/185.01 |
| 5,708,776 | 1/1998 | Kikinis | 395/185.08 |
| 5,712,754 | 1/1998 | Sides et al. | 361/58 |
| 5,715,456 | 2/1998 | Bennett et al. | 395/652 |
| 5,717,570 | 2/1998 | Kikinis | 361/685 |
| 5,726,506 | 3/1998 | Wood . | |
| 5,727,207 | 3/1998 | Gates et al. | 395/651 |
| 5,732,266 | 3/1998 | Moore et al. | 395/651 |
| 5,737,747 | 4/1998 | Vishlitzky et al. | 711/118 |
| 5,740,378 | 4/1998 | Rehl et al. . | |
| 5,742,514 | 4/1998 | Bonola | 364/492 |
| 5,747,889 | 5/1998 | Raynham et al. . | |
| 5,748,426 | 5/1998 | Bedingfield et al. . | |
| 5,754,396 | 5/1998 | Felcman et al. | 361/683 |
| 5,754,449 | 5/1998 | Hoshal et al. | 364/550 |
| 5,754,797 | 5/1998 | Takahashi . | |
| 5,758,165 | 5/1998 | Shuff | 395/712 |
| 5,758,352 | 5/1998 | Reynolds et al. | 707/200 |
| 5,761,033 | 6/1998 | Wilhelm . | |
| 5,761,045 | 6/1998 | Olson et al. . | |
| 5,761,085 | 6/1998 | Giorgio | 364/505 |
| 5,761,707 | 6/1998 | Aiken et al. | 711/118 |
| 5,764,968 | 6/1998 | Ninomiya | 395/560 |
| 5,765,198 | 6/1998 | McCrocklin et al. . | |
| 5,767,844 | 6/1998 | Stoye | 345/212 |
| 5,768,541 | 6/1998 | Pan-Ratzlaff . | |
| 5,768,542 | 6/1998 | Enstrom et al. . | |

| | | | |
|---|---|---|---|
| 5,771,343 | 6/1998 | Hafner et al. | 395/182.02 |
| 5,774,640 | 6/1998 | Kurio | 395/182.02 |
| 5,774,645 | 6/1998 | Beaujard et al. | 395/183.01 |
| 5,777,897 | 7/1998 | Giorgio | 364/557 |
| 5,781,716 | 7/1998 | Hemphill et al. | 395/182.02 |
| 5,781,744 | 7/1998 | Johnson et al. | 395/283 |
| 5,781,767 | 7/1998 | Inoue et al. | |
| 5,781,798 | 7/1998 | Beatty et al. | |
| 5,784,555 | 7/1998 | Stone | 395/200.5 |
| 5,784,576 | 7/1998 | Guthrie et al. | |
| 5,787,019 | 7/1998 | Knight et al. | 364/550 |
| 5,787,491 | 7/1998 | Merkin et al. | 711/173 |
| 5,790,831 | 8/1998 | Lin et al. | |
| 5,793,948 | 8/1998 | Asahi et al. | 395/184.01 |
| 5,793,987 | 8/1998 | Quackenbush et al. | 395/280 |
| 5,793,992 | 8/1998 | Steele et al. | 395/293 |
| 5,794,035 | 8/1998 | Golub et al. | |
| 5,796,185 | 8/1998 | Takata et al. | |
| 5,796,934 | 8/1998 | Bhanot et al. | 395/182.02 |
| 5,796,981 | 8/1998 | Abudayyeh et al. | |
| 5,797,023 | 8/1998 | Berman et al. | 395/750.06 |
| 5,798,828 | 8/1998 | Thomas et al. | |
| 5,799,036 | 8/1998 | Staples | |
| 5,799,196 | 8/1998 | Flannery | 395/750.03 |
| 5,802,269 | 9/1998 | Poisner et al. | |
| 5,802,298 | 9/1998 | Imai et al. | 395/200.47 |
| 5,802,393 | 9/1998 | Begun et al. | |
| 5,802,552 | 9/1998 | Fandrich et al. | 711/103 |
| 5,802,592 | 9/1998 | Chess et al. | 711/164 |
| 5,805,804 | 9/1998 | Laursen et al. | 395/200.02 |
| 5,805,834 | 9/1998 | McKinley et al. | |
| 5,809,224 | 9/1998 | Schultz et al. | |
| 5,809,256 | 9/1998 | Najemy | 395/283 |
| 5,809,287 | 9/1998 | Stupek, Jr. et al. | 395/500 |
| 5,809,311 | 9/1998 | Jones | 395/750.01 |
| 5,809,555 | 9/1998 | Hobson | 711/172 |
| 5,812,757 | 9/1998 | Okamoto et al. | |
| 5,812,858 | 9/1998 | Nookala et al. | |
| 5,815,117 | 9/1998 | Kolanek | |
| 5,815,647 | 9/1998 | Buckland et al. | 395/182.01 |
| 5,815,651 | 9/1998 | Litt | 395/182.08 |
| 5,815,652 | 9/1998 | Ote et al. | 395/183.07 |
| 5,822,547 | 10/1998 | Boesch et al. | |
| 5,826,043 | 10/1998 | Smith et al. | 395/281 |
| 5,829,046 | 10/1998 | Tzelnic et al. | 711/162 |
| 5,838,935 | 11/1998 | Davis et al. | 395/309 |
| 5,841,964 | 11/1998 | Yamaguchi | 395/113.21 |
| 5,845,061 | 12/1998 | Miyamoto et al. | 395/182.02 |
| 5,845,095 | 12/1998 | Reed et al. | 395/283 |
| 5,850,546 | 12/1998 | Kim | 395/651 |
| 5,852,724 | 12/1998 | Glenn, II et al. | 395/200.69 |
| 5,857,102 | 1/1999 | McChesney et al. | 395/653 |
| 5,864,654 | 1/1999 | Marchant | 395/182.01 |
| 5,864,713 | 1/1999 | Terry | 395/872 |
| 5,867,730 | 2/1999 | Leyda | 395/830 |
| 5,875,307 | 2/1999 | Ma et al. | 395/281 |
| 5,875,308 | 2/1999 | Egan et al. | 395/283 |
| 5,878,237 | 3/1999 | Olarig | 395/308 |
| 5,878,238 | 3/1999 | Gan et al. | 395/308 |
| 5,884,027 | 3/1999 | Garbus et al. | 395/200.8 |
| 5,884,049 | 3/1999 | Atkinson | 395/281 |
| 5,886,424 | 3/1999 | Kim | 307/64 |
| 5,889,965 | 3/1999 | Wallach et al. | 395/283 |
| 5,892,898 | 4/1999 | Fujii et al. | 395/185.1 |
| 5,892,915 | 4/1999 | Duso et al. | 395/200.49 |
| 5,892,928 | 4/1999 | Wallach et al. | 395/283 |
| 5,893,140 | 4/1999 | Vahalia et al. | 711/118 |
| 5,898,846 | 4/1999 | Kelly | 395/284 |
| 5,898,888 | 4/1999 | Guthrie et al. | 395/308 |
| 5,905,867 | 5/1999 | Giorgio | 395/200.54 |
| 5,907,672 | 5/1999 | Matze et al. | 395/182.06 |
| 5,913,034 | 6/1999 | Malcolm | 395/200.53 |
| 5,918,057 | 6/1999 | Chou et al. | 395/733 |
| 5,922,060 | 7/1999 | Goodrum | 710/103 |
| 5,935,262 | 8/1999 | Barrett et al. | 714/46 |
| 5,936,658 * | 8/1999 | Kato et al. | 347/247 |
| 5,936,960 * | 8/1999 | Stewart | 370/438 |
| 5,938,751 | 8/1999 | Tavallaei et al. | 710/103 |
| 5,941,996 | 8/1999 | Smith et al. | 714/47 |
| 5,987,554 * | 11/1999 | Liu et al. | 710/129 |
| 5,987,621 | 11/1999 | Duso et al. | 714/4 |
| 5,987,627 | 11/1999 | Rawlings, III | 714/48 |
| 6,012,130 | 1/2000 | Beyda et al. | 711/173 |
| 6,038,624 | 3/2000 | Chan et al. | 710/103 |

OTHER PUBLICATIONS

NetFRAME Systems Incorporated, datasheet, 2 pages, Feb. 1996, "NF450FT Network Mainframe."

NetFRAME Systems Incorporated, datasheet, 9 pages, Mar. 1996, "NetFRAME Cluster Server 8000."

Joint work by Intel Corporation, Compaq, Adaptec, Hewlett Packard, and Novell, presentation, 22 pages, Jun. 1996, "Intelligent I/O Architecture."

Lockareff, M., HTINews, http:www.hometoys.com/htinews/dec96/articles/lonworks.htm, 2 pages, Dec. 1996, "Loneworks—An Introduction."

Schofield, M.J., http://www.omegas.co.uk/CAN/canworks.htm, 4 pages, Copyright 1996, 1997, "Controller Area Network—How CAN Works."

NTRR, Ltd, http://www.nrtt.demon.co.uk/cantech.html, 5 pages, May 28, 1997, "CAN: Technical Overview."

Herr, etal., Linear Technology Magazine, Design Features, pp. 21–23, Jun. 1997, "Hot Swapping the PCI Bus."

PCI Special Interest Group, specification, 35 pages, Draft For Review Only, Jun. 15, 1997, "PCI Bus Hot Plug Specification."

Microsoft Corporation, file:///A|/Rem$_{13}$ devs.htm, 4 pages, Copyright 1997, updated Aug. 13, 1997, "Supporting Removable Devices Under Windows and Windows NT."

ftp.cdrom.com/pub/os2/diskutil/, PHDX software, phdx.zip download, Mar. 1995, "Parallel Hard Disk Xfer."

Cmasters, Usenet post to microsft.public.windowsnt.setup, Aug. 1997, "Re: FDISK switches."

Hildebrand, N., Usenet post to comp.msdos.programmer, May 1995, "Re: Structure of disk partition into."

Lewis, L., Usenet post to alt.msdos.batch, Apr. 1997, "Re: Need help with automating FDISK and FORMAT."

Netframe, http://www.netframe–support.com.technology/datasheets/data.htm, before Mar. 1997, "Netframe Cluster-System 9008 Data Sheet."

Simos, M., Usenet post to comp.os.msdos.misc, Apr. 1997, "Re: Auto FDISK and FORMAT."

Wood, M.H., Usenet post to comp.os.netware.misc, Aug. 1996, "Re: Workstation duplication method for WIN95."

Davis, T, Usenet post to alt.msdos.programmer, Apr. 1997, "Re: How do I create an FDISK batch file?".

Davis, T., Usenet post to alt.msdos.batch, Apr. 1997, "Re: Need help with automating FDISK and FORMAT . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novel® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulletin, 92A+62947, pp. 391–394, Oct. 1992, Method for Card Hot Plug Detection and Control.

* cited by examiner-

APPARATUS FOR RECORDING INFORMATION SYSTEM EVENTS

RELATED APPLICATIONS

The subject matter of U.S. Patent Application entitled METHOD OF RECORDING INFORMATION SYSTEM EVENTS, filed on Oct. 1, 1997, application Ser. No. 08/942, 164, still pending, is related to this application.

PRIORITY CLAIM

The benefit under 35 U.S.C. § 119(e) of the following U.S. provisional application(s) is hereby claimed:

| Title | Application No. | Filing Date |
|---|---|---|
| "Remote Access and Control of Environmental Management System" | 60/046,397 | May 13, 1997 |
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |

APPENDICES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates generally to information processing systems, such as system servers and personal computers (PCs). More particularly, this invention relates to the management and maintenance of information system failures.

2. Description of the Related Art

Information processing systems, such as computer system servers, have virtually become an inseparable part of information processing networks. These systems communicate and process an enormous amount of information in a relatively short time. To perform these sophisticated tasks, a computer system server typically includes various subsystems and components such as a plurality of microprocessors, memory modules, various system and bus control units, and a wide variety of data input/output (I/O) devices. These computer components communicate information using various data rates and protocols over multiple system buses. The demand for faster processing speeds, and the revolutionary fast-track development of computer systems, have necessitated the use of interconnecting devices. The wide variety of these devices, coupled with various data transfer protocols, have added special complexity to the management and maintenance of faults occurring in such information systems.

Figure 1:
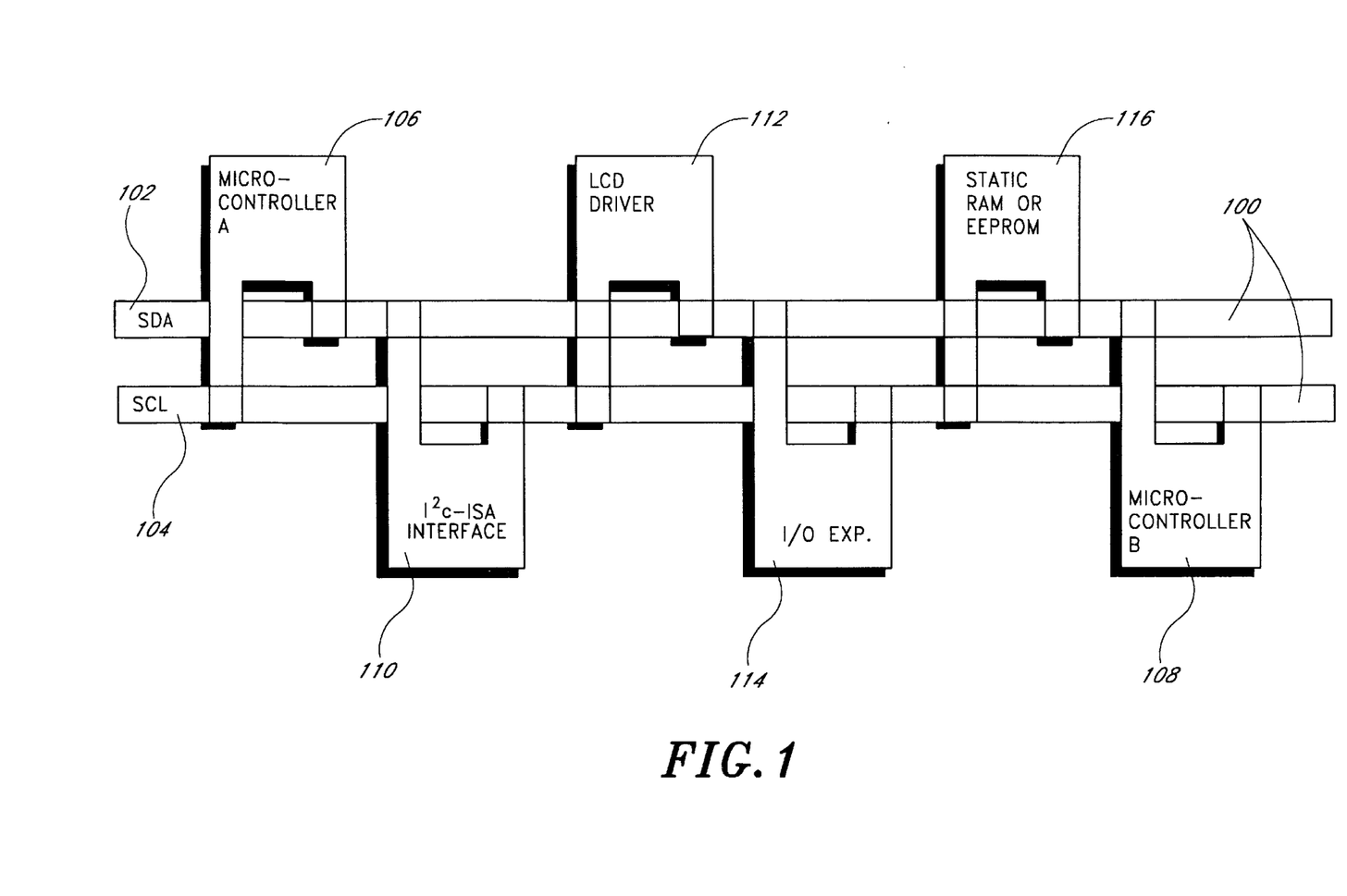
FIG. 1 is functional block diagram of an exemplary I²C bus application.

To facilitate the understanding of the invention, a brief description of the I$^2$C bus protocol is first provided. FIG. 1 is a functional block diagram of an exemplary I$^2$C bus application. As shown in FIG. 1, an I$^2$C Bus 100 is provided to support data transfer among a variety of I$^2$C devices. The I$^2$C Bus 100 is a serial interface bus that allows multiple I$^2$C devices to communicate via a bidirectional, two-wire serial bus. The I$^2$C Bus 100 comprises two wires: a serial data line (SDA) 102 and a serial clock line (SCL) 104. The SDA 102 carries data transmissions among I$^2$C devices, and the SCL 104 carries the clock timing information that synchronizes the data transmission. A complete system usually consists of at least one microcontroller and other peripheral devices such as memory units and input/output (I/O) expanders for transferring data on the I$^2$C Bus 100. These peripheral devices may include liquid crystal display (LCD) and light emitting diode (LED) drivers, random access memory (RAM) and read only memory (ROM) devices, clock/calendars, I/O expanders, analog-to-digital (A/D) and digital-to-analog (D/A) converters.

As shown in FIG. 1, a micro-controller A 106 and a micro-controller B 108 are coupled to the I$^2$C Bus 100 for exchanging information on the I$^2$C Bus 100. Additionally, an I$^2$C-ISA Interface 110 is connected to the I$^2$C Bus 100 to provide access interface between industry standard architecture (ISA) devices and I$^2$C devices. A LCD driver 112 is coupled to the I$^2$C Bus 100 for displaying information accessed from other I$^2$C devices located on the I$^2$C Bus 100. An I/O Expander 114 is also coupled to the I$^2$C Bus 100 to enable I/O devices (not shown in this figure) to obtain direct access to the I$^2$C Bus 100. Moreover, a memory device 116 such as a RAM or an electrically erasable programmable read only memory (EEPROM) is also coupled to the I$^2$C Bus 100 to provide storage of data transmitted by other I$^2$C devices.

Each device connected to the I$^2$C bus is software addressable by a unique address and simple master/slave relationships exist at all times. The term "master" refers to an I$^2$C device which initiates a transfer command to another I$^2$C device, generates clock signals, and terminates the transfer on the I$^2$C bus. The term "slave" refers to the I$^2$C device which receives the transfer command from the master device on the I$^2$C bus. The I$^2$C bus is a true multi-master bus which includes collision detection and arbitration to prevent data corruption if two or more masters simultaneously initiate data transfer. Moreover, I$^2$C devices act as transmitters and receivers. A "transmitter" is the I$^2$C device which sends the data to the I$^2$C Bus 100. A "receiver" is the I$^2$C device which receives the data from the I$^2$C Bus 100. Arbitration refers to a procedure whereby, if more than one master simultaneously attempts to control the I$^2$C Bus 100, only one is allowed to do so and the transmitted message is not corrupted.

The I$^2$C Bus 100 supports up to 40 I$^2$C devices and may have a maximum length of 25 feet. The I$^2$C Bus 100 supports a transfer data rate of up to 100 kilobits/second (kbps) in "standard mode," or up to 400 kbps in "fast mode." Data transfers over the I$^2$C Bus 100 follow a well-defined protocol. A transfer always takes place between a master and a slave. All bus transfers are bounded by a "Start" and a "Stop" condition. In the standard mode, the first byte after the Start condition usually determines which slave will be selected by the master. In the fast mode, the first two bytes after the Start condition usually determine which slave will be selected by the maser. Each peripheral device on the I$^2$C Bus 100 has a unique 8-bit address in the standard mode, or a 10-bit address in the fast mode. The address is hard-coded for each type of I²C device, but some devices provide an input pin that allows a designer to specify one bit of the device's I²C address. This allows two identical I²C devices used on the same bus to be addressed individually.

With the increased complexity of information processing systems, the frequency of system failures due to system- and component-level errors has increased. Some of the problems are found in the industry standard architecture (ISA) bus used in IBM PC-compatible computers. The enhanced ISA (EISA) provided some improvement over the ISA architecture of the IBM PC/AT, but more resistance to failure and higher performance are still required. Other problems may exist in interface devices, such as bus-to-bus bridges. Additionally, problems may exist in bus peripheral devices such as microcontrollers, central processors, power supplies, cooling fans, and other similar components.

With these added components and subsystems, occasional system failures have become inevitable. Existing information systems do not currently provide a tool for managing these failures. More importantly, present systems do not possess the means to more efficiently diagnose and restore the system from the occurrence of such failures. Therefore, when failures occur, there is a need to identify the events leading up to these failures. The ability to identify the events leading up to system failures minimizes downtime and ensures more efficient system maintenance and repair in the future.

SUMMARY OF THE INVENTION

One embodiment of the invention provides a system for recording event messages with a real-time stamp in a memory unit. The system records an event message occurring in an information processing system having a computer bus. The system comprises a system recorder connected to the computer bus. The system further comprises a processing unit accessing the system recorder via the computer bus. The processing unit transmits a message to said system recorder in response to the event occurring in the information processing system. The system further comprises a memory unit connected to the system recorder for receiving the message for storage.

BRIEF DESCRIPTION OF THE DRAWINGS

The invention will be better understood by referring to the following detailed description, which should be read in conjunction with the accompanying drawings, in which.

DETAILED DESCRIPTION OF THE INVENTION

The invention provides a system for recording a time-stamped history of events leading up to the failure of an information system server. The system may be referred to as a black box recorder (hereinafter the "System Recorder"). One embodiment of the invention involves system operation on an Inter-Integrated-Circuit (I²C) bus. The operation of the System Recorder on an I²C bus should not, however, be construed to imply any limitations on the bus protocol which may be used with this invention. The invention may be implemented using virtually any bus protocol.

Figure 2:
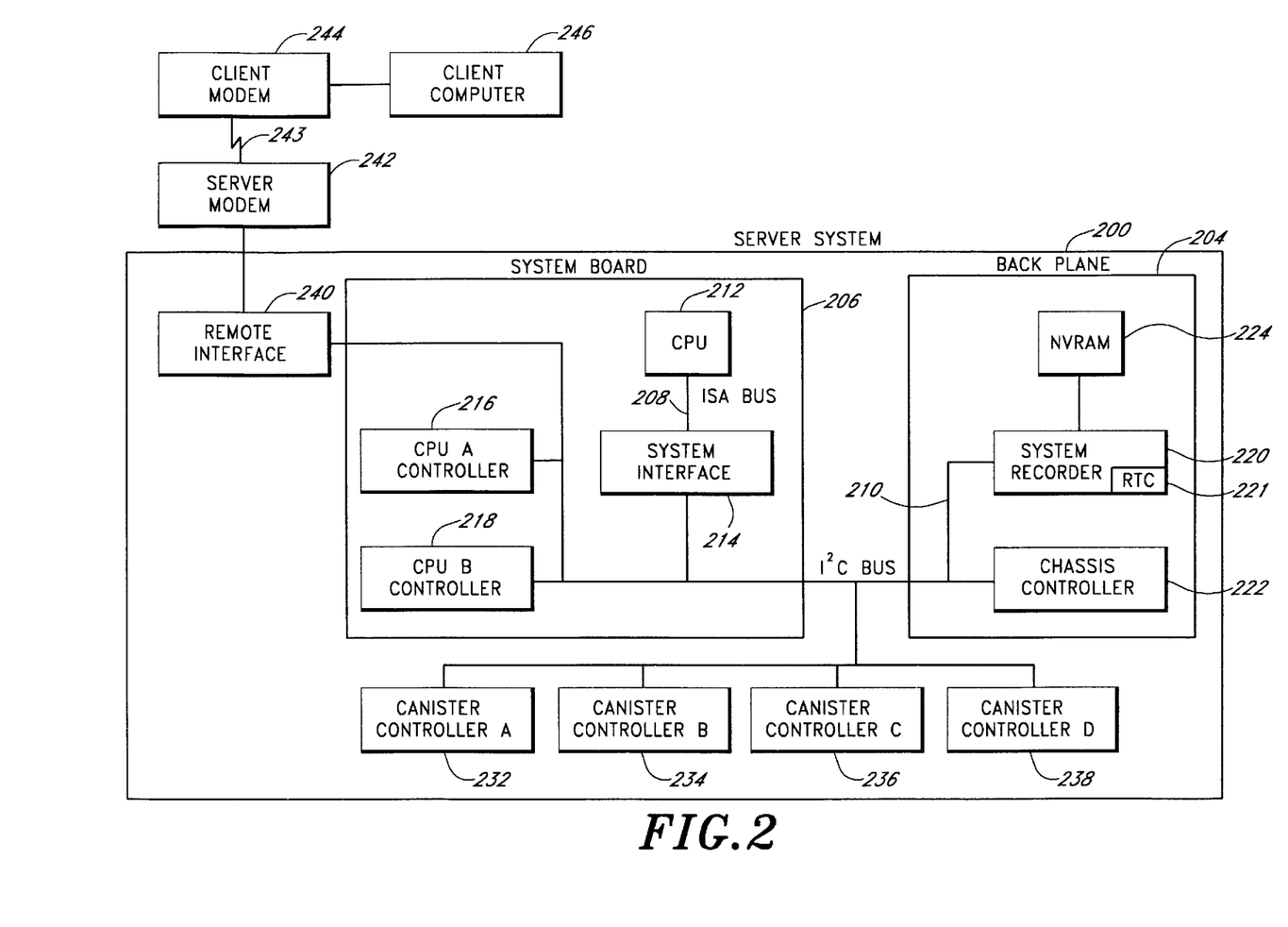
FIG. 2 is a functional block diagram of one embodiment of the invention.

Referring now to FIG. 2, a functional block diagram of an embodiment of the invention is shown. This embodiment depicts the system server 200 which comprises the so-called "Intrapulse" system. The system server 200 is a network of microcontrollers integrated to support the transfer of data messages within the system server 200. The system server 200 performs control and monitoring functions of processing units, power supplies, cooling fans, and similar functions. To achieve its monitoring objective, the system server 200 utilizes a variety of control, diagnostic, monitoring, and logging processors. The system server 200 may employ switches, indicators, or other controls to perform its monitoring and control functions. Optionally, the system server 200 need not employ any switches, indicators, or other controls, to perform these functions. This characteristic is often referred to as the "fly-by-wire" feature.

The system server 200 is a part of and supports one or more microcontroller networks (not shown in this figure). A microcontroller network further includes a variety of peripheral components such as AC/DC power supplies and cooling fans. The system server 200 may be divided into two main subsystems: the system board 206 and the back plane 204. Communication between main system processing units (e.g., CPU 212) and the system interface 214 on the system board 206 is supported by an industry standard architecture (ISA) Bus 208. Communication among the devices located on the back plane 204 is supported by an I²C Bus 210. The I²C Bus 210 also supports communication between the back plane 204 and the system board 206.

The system board 206 comprises a system interface 214 and a plurality of central processor units (CPUs) including CPU "A Controller" 216 and CPU "B Controller" 218 interconnected via the I²C Bus 210. One or more system CPU 212 communicates with the devices on the system board 206 via an ISA Bus 208. The system interface 214 provides a bridging function between the CPU 212 and the A Controller 216 and B Controller 218 on the system board 206. In addition, the system interface 214 interconnects the CPU 212 with other devices on the I²C Bus 210. A remote interface 240 is connected to the system board 206 to allow remote access by outside clients to the system server 200. Using a client modem 244, a client computer 246 accesses a server modem 242 via a remote link 243. The server modem 242 is typically directly connected to the remote interface 240 to support communication between the server system 200 and the client computer 246.

The back plane 204 includes a system recorder 220 and a chassis controller 222 interconnected via the I²C Bus 210. The system recorder 220 includes a real-time clock (RTC) 221. Additionally, a non-volatile random access memory (NVRAM) 224 is directly connected to the system recorder 220. A plurality of canister controllers are also coupled to the I²C Bus 210 to communicate with devices located on the back plane 204 and the system board 206. These canister controllers include "Canister Controller A" 232, "Canister Controller B" 234, "Canister Controller C" 236, and "Canister Controller D" 238 (the "canister controllers"). Generally, a canister is a detachable module which provides expendability to a plurality of peripheral component inter-connect (PCI) devices. FIG. 2 does not show the canister controllers as part of the back plane 204 because they are removable units.

One embodiment of the system recorder 220 is a high-performance, CMOS, fully-static, 8-bit microcontroller which controls read and write operations from and into the NVRAM 224, respectively. The system recorder 220 of FIG. 2 has a multi-level deep stack, and multiple internal and external interrupt sources. The system recorder 220 may employ a Harvard architecture for allowing a 14-bit wide instruction word with separate 8-bit wide data. The system recorder 220 has 192 bytes of RAM and 33 I/O pins. In addition, several peripheral features are available, including: three timer/counters, two Capture/Compare modules, and two serial ports. The system recorder 220 can directly or indirectly address its register files or data memory. All special function registers including the program counter are mapped in the data memory. The system recorder 220 has a synchronous serial port which may be configured as either a two-wire I$^2$C bus or a 3-wire serial peripheral interface (SPI). An 8-bit parallel slave port is also provided. The system recorder 220 may be based on microcontrollers manufactured by Microchip Technology Inc., e.g., the PIC16C6X family of microcontrollers.

The RTC 221 is integrated in the system recorder 220 on the back plane 204. The RTC 221 comprises two 32-bit counters which keep track of real time and elapsed time in seconds. The RTC 221 comprises a four-byte field (i.e., 32 bits) for recording time for over 125 years (2^32 seconds) without having to reset itself. It is designed to count seconds when its input power ($V_{cc}$) is applied and continually count seconds under battery backup regardless of the condition of $V_{cc}$. The continuous counter is used to derive time of day, week, month, and year by using a software algorithm. Alternatively, the RTC 221 is used under the control of the system recorder 220 to record real time events. Communication to and from the RTC 221 takes place via a 3-wire serial port. A one byte protocol selects read/write functions, counter clear functions and oscillator trim. The RTC 221 records real time in an absolute format. The O/S uses a reference point in time in order to synchronize the RTC 221 with the standard 24-hour time format.

One embodiment of the NVRAM 224 is a 128-kbyte memory unit which is organized as 131,072 words by 8 bits. Each NVRAM 224 has a self-contained lithium energy source and control circuitry which continuously monitors its input voltage ($V_{cc}$) for an out-of tolerance condition (e.g., +/-10% of 5 Volts). When such a condition occurs, the lithium energy source is automatically switched on and write protection is unconditionally enabled to prevent data corruption. With special firmware, the NVRAM 224 is divided into two blocks: a first block having 64 kbytes of memory space, and a second block having 64 kbytes of memory space. The first block of the NVRAM 224 is a fixed-variable memory block which stores ID codes of the devices installed in the network. In addition to ID codes, the first block of NVRAM 224 may also store one or more address pointers, each pointing to a memory address in the second block of NVRAM 224. An address pointer may be a head pointer (indicating a start address) or a tail pointer (indicating an end address). The second block is a memory block which stores message codes in connection with events occurring in the network. The NVRAM 224 may be based upon devices manufactured by Dallas Semiconductor Corporation, e.g., the DS1245Y/AB 1024K Nonvolatile SRAM.

Once the system server 200 is powered on, the system recorder 220 writes an internal message entry to the NVRAM 224. When the power up process is enabled, the back plane 204 monitors the status of several system events and functions. These functions may include system temperature, fan speeds, and changes in the installation or presence of canisters and power supplies. Non-specific or general faults on most devices in the microcontroller network may be monitored in a summary bit. However, the fans, canisters, and temperature of the CPU may be monitored with particularity.

The back plane 204 monitors a plurality of temperature sensors located on a temperature bus (not shown in this figure) once every predetermined time interval, e.g., every second. Each temperature sensor comprises a transducer connected to and having an address at a serial bus (not shown in this figure) on the back plane 204. These transducers are read in the same sequence as their address order. The temperature may range between –25 and +70 degrees Celsius. If any of the temperature sensors reaches +55 degrees Celsius, or –25 degrees Celsius, then a warning is issued, and a message corresponding to that event is written to the NVRAM 224, and sent to other destinations via the system interface 214 and the remote interface 240. If any of the temperature sensors reaches +70 degrees Celsius, then a shutdown command is typically issued and the system is powered off.

The back plane 204 monitors the presence of the canisters several times per second. There are several methods to determine the presence or absence of a canister. To monitor the canister corresponding for Canister Controller A 232 for example, the chassis controller 222 sends a reset pulse to that canister, preferably through a direct one-wire serial bus connection. If the canister is changed/replaced, then the chassis controller 222 updates a canister presence bit accordingly and sends a canister event message to the system recorder 220 and remote interface 240, preferably via the I$^2$C Bus 210. The system recorder 220 replaces the ID code (e.g., a serial number string) of the previous canister (corresponding to Canister Controller A 232) by the ID code of the current canister in the NVRAM 224 accordingly. If a canister is removed from the server system 200, then the length of the ID code string of that (absent) canister is set to zero. However, if a new canister is installed, the ID code of the new canister is written to the NVRAM 224. Serial numbers are typically stored in NVRAM 224 in BCD format.

Similarly, the back plane 204 monitors the presence or absence of power supplies several times per second. To monitor a particular power supply, the chassis controller 222 transmits a reset pulse to detect a pulse of the power supply, preferably via a direct one-wire serial bus. If a power supply is replaced, the chassis controller 222 updates the presence bit for that power supply and sends a message corresponding to that power supply event to the NVRAM 224 and the remote interface 240. If a power supply is removed from the network, then the length of the ID code (e.g., serial number string) of that (absent) power supply is set to zero. However, if a new power supply is installed in the network, the system recorder 220 writes the ID code of that power supply into the NVRAM 224.

Similarly, the back plane 204 may monitor the speeds of the cooling fans of all CPUs in the same sequence as the CPU's address order. For instance, the cooling fan of the system board 206 generally has a low-speed limit of about 30 revolutions per second (rps). Moreover, the cooling fan of a canister typically has a low-speed limit of about 20 rps. If the speed of any fan falls below its set low limits, a fan fault corresponding to that fan is issued. In addition, the system recorder 220 writes a fan event message into the NVRAM 224. Corrective measures such as setting a fan fault LED on, and setting the fan speed to high, may also be performed.

The protocol of the I²C Bus 210 uses an address in the memory NVRAM 224 of the system server 200 as the means of identifying various control and diagnostic commands. Any system function is queried by generating a "read" request. Conversely, a function can be executed by generating a "write" request to an address specified in the protocol format. An I²C device in the system server 200 initiates read and write requests by sending a message on the I²C bus. A read or write request may consist of a payload, a message, and a packet. A payload is the data included in the request command. A message is a wrapper around the payload. In addition to the data, the message may include a slave address, a least significant bit (LSBit), a most significant bit (MSBit), a data type, a command ID (LSByte and MSByte), and status. A packet is a wrapper around a message that is transferred to the ISA Bus 208. The packet includes check sum and inverted slave address fields.

The slave address is typically a 7-bit wide field which specifies the identification code of a slave device. The slave address usually occupies the first byte of the message. The LSBit may specify the type of activity that is taking place on the bus. If the LSBit is set to 1 (i.e., high), the master is reading from a slave device. If the LSBit is set to 0 (i.e., low), then the master is writing to a slave device. The MSBit is bit 7 of the second byte (0–7 bits) of the message which specifies the type of command being executed. If the MSBit is set to a 1, then the command is a read command. If the MSBit is set to a 0, then the command is a write command. The data type specifies the data format of a read or write command. There are several data types that may be used in the server system 200. The data types include: a bit data type, a byte data type, a string data type, a log data type, an event data type, a queue data type, a byte array data type, a lock data type, and a screen data type. These data types determine the value specified in the Type field of a message.

A bit data type is typically used for a simple logic value, such as True (1) and False (0), or On (1) and Off (0). The byte data type is used for a single-byte value, with a variable length of 0 through FF (hexadecimal). A string data type is used for a variable-length string of data having a length of 0 to FF bytes. The log data type is used to write a byte string to a circular log buffer, such as the NVRAM 224. The log data type records system events in the NVRAM 224. A byte array data type is used for general data storage which is not anticipated in the implementation of the Intrapulse system. An event data type is used to alert external interfaces of certain events occurring in the system server 200, such as status changes in the CPU, power supplies, canisters, cooling fans, temperature, screen, queue, and O/S timeout. A screen data type is used to communicate character mode screen data from BIOS to the remote interface unit 240.

The command ID (LSByte) specifies the least significant byte of the device address. Command ID (MSByte) specifies the most significant byte of the device address. The status byte specifies whether or not a command has been executed successfully. A non-zero entry indicates an execution failure. The check sum byte specifies a direction control byte to ensure the integrity of a message on the bus. The check sum byte is typically calculated in the system server 200 firmware. Finally, the inverted slave address byte specifies the slave address in an inverted format. The inverted slave address byte is also calculated in the system server 200 firmware.

Figure 3:
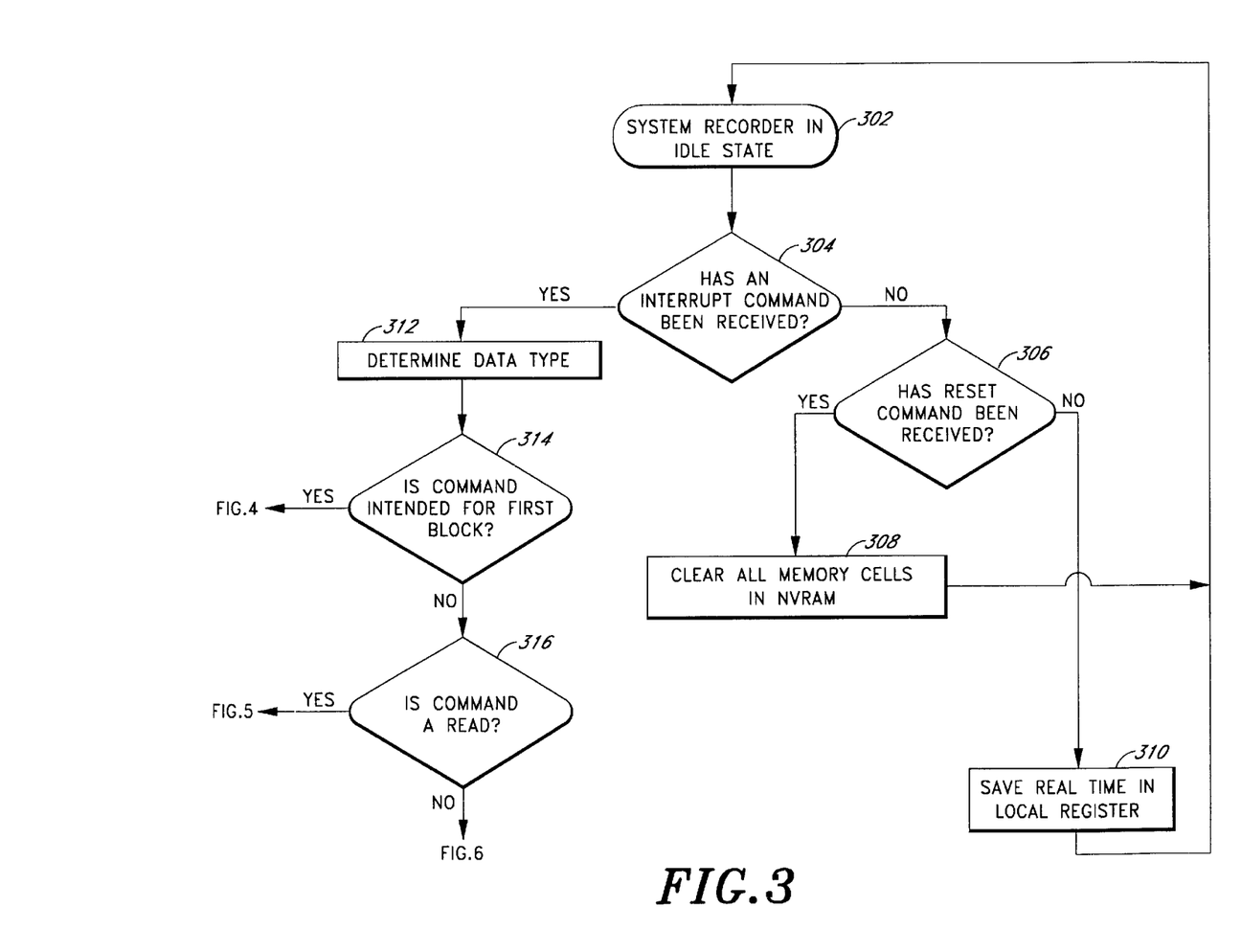
FIG. 3 is a flow chart describing the decisional steps performed by one emobidment of the system recorder.

Referring now to FIG. 3, a flow chart is provided for describing the decisional steps performed by the system recorder 220 upon receiving interrupt commands from other microcontrollers. At step 302, the system recorder 220 is typically in an idle state, i.e., waiting for commands from other microcontrollers in the network. At step 304, the system recorder 220 determines if an interrupt command is detected from other microcontrollers. If no interrupt command is detected, then at step 306, the system recorder 220 checks if a reset command is received from other microcontrollers. A reset command is a request to clear the all memory cells in the NVRAM 224. If a reset command is detected, then at step 308, the system recorder 220 clears all memory cells in the NVRAM 220 and returns to its idle state at step 302, and the entire process repeats itself. If a reset command is not detected, then at step 310, the system recorder 220 updates the RTC 221 time every one second. At this step, the system recorder 220 reads the real time clock and saves the real time in its local register (not shown in this figure).

If, at step 304, an interrupt command is detected from other microcontrollers, the system recorder 220 determines the type of data in the interrupt command at step 312. For the purpose of logging message events in the NVRAM 224, the log data and event data type are pertinent. As noted above, the log data type is used to write a byte string to a circular log buffer, such as the NVRAM 224. The log data type records system events in the NVRAM 224. The maximum number of bytes that can be written in a log entry is 249 bytes. For some embodiments of the invention, the system recorder 220 adds a total of six bytes at the beginning of the interrupt command: a two-byte identification code (ID), and a four-byte timestamp for recording the real time of the occurrence of the system event.

Figure 4:
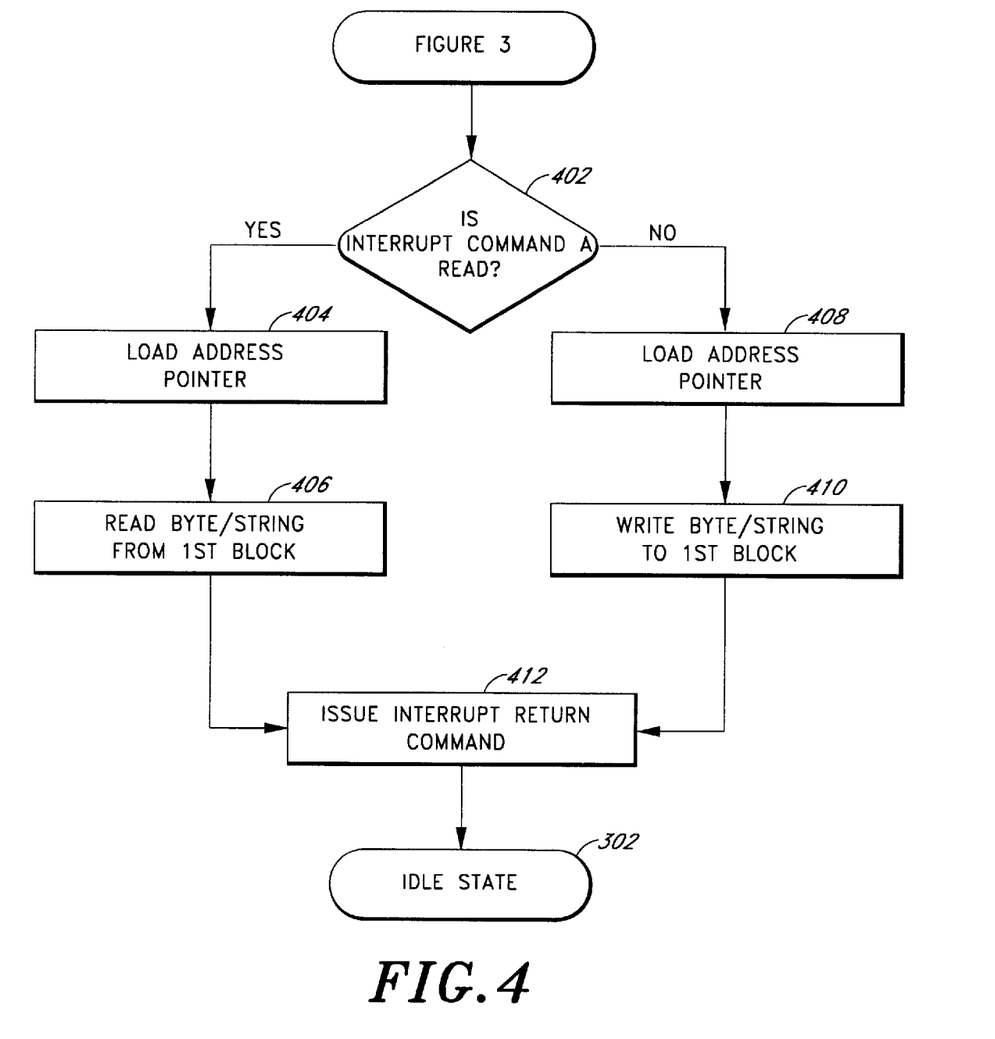
FIG. 4 is a flow chart describing the steps of performing an exemplary read from and/or write operations to a first block of the memory unit.
Figure 5:
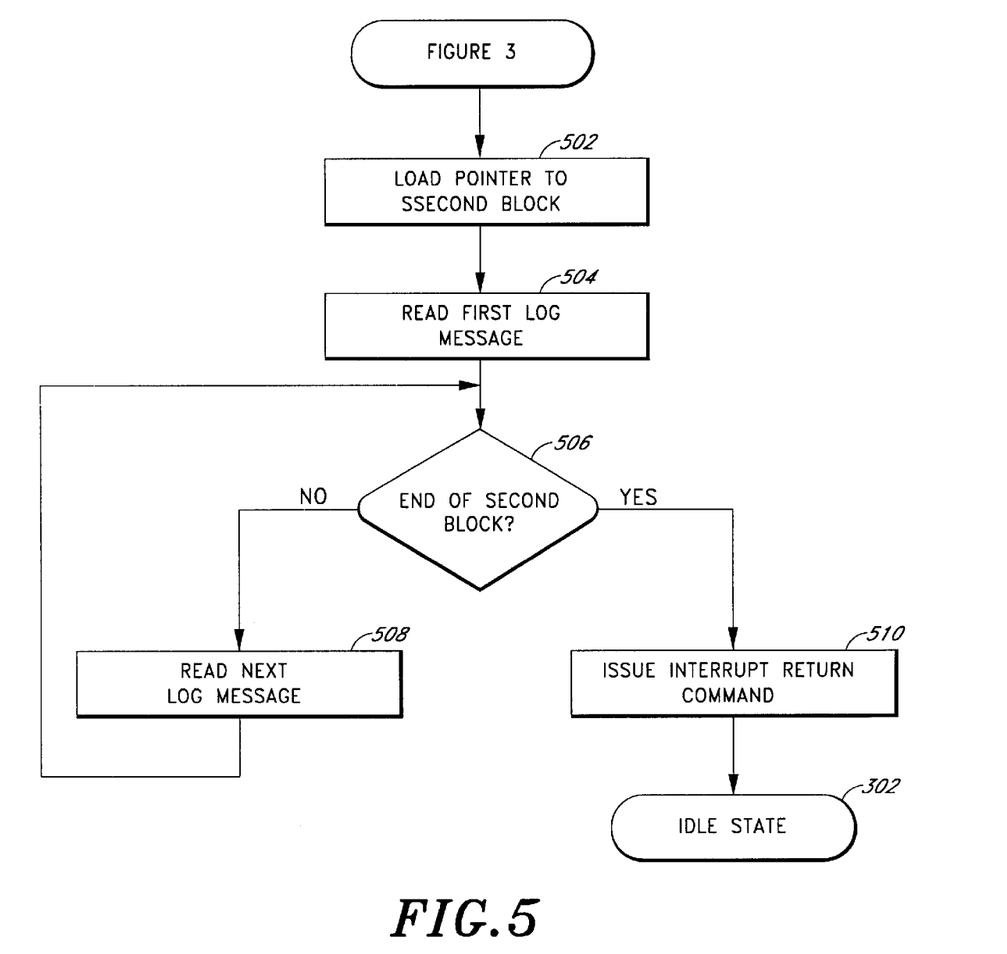
FIG. 5 is a flow chart describing the steps of performing an exemplary read operation from a second block of the memory unit.
Figure 6:
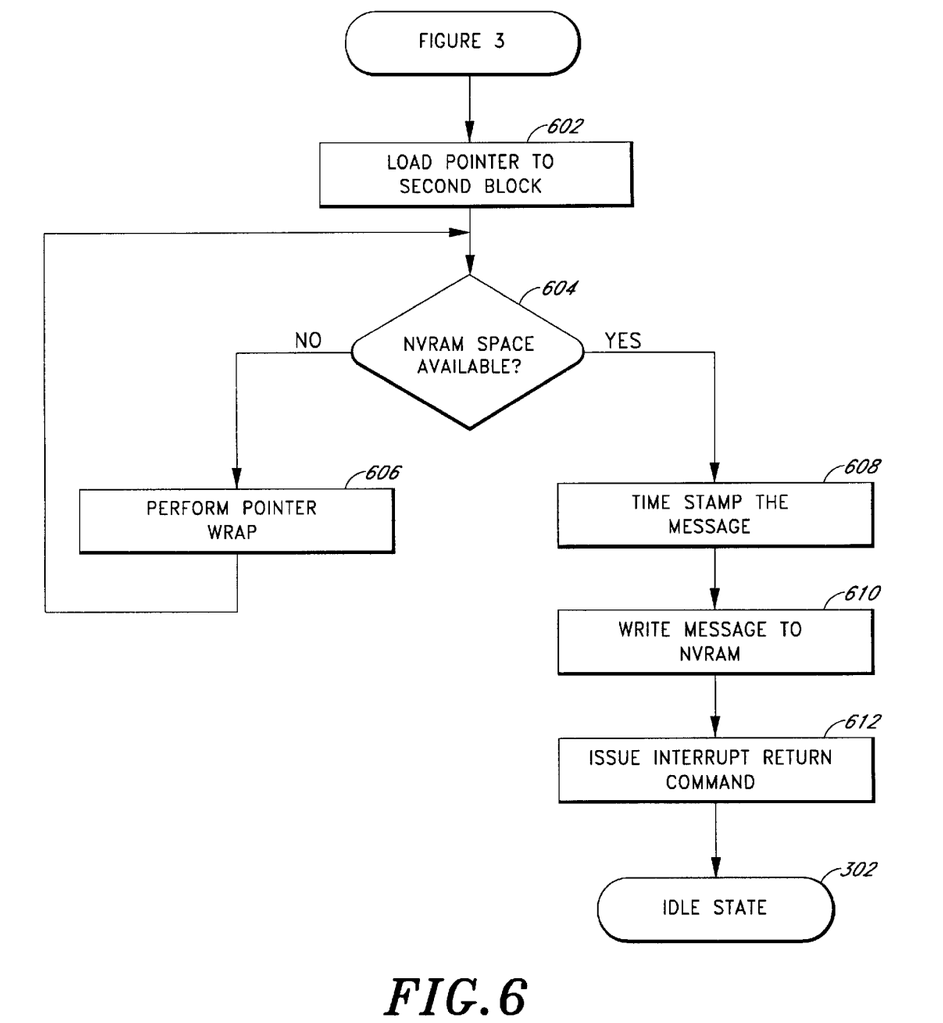
FIG. 6 is a flow chart describing the steps of performing an exemplary write operation to a second block of the memory unit.

Based on the interpretation of the data type at step 314, the system recorder 220 determines whether the interrupt command is intended to be communicated to the first block or second block of the NVRAM 224. If the interrupt command is intended to go to the first block of NVRAM 224, then the process described in FIG. 4 is followed. If the interrupt command is not intended to be transmitted to the first block of NVRAM 224, then it is intended to go to the second block of NVRAM 224. At step 316, the system recorder 220 determines whether the interrupt command is a read or write command for the second block. If the interrupt command is a read command, then the process described in FIG. 5 is followed. If the interrupt command is not a read command, then it is a write command and the process described in FIG. 6 is followed.

Referring to FIG. 4, a flow chart is provided for describing the steps of performing a read from and/or write to the first block of the NVRAM 224. As noted above, the first block of the NVRAM 224 is a 64-kbyte memory block. The first block is a fixed-variable memory block which stores ID codes of the devices installed in the network. Hence, a command addressed to the first block is typically generated by a controller (e.g., chassis controller 222) responsible for updating the presence or absence of devices in the network. The process described in FIG. 4 is followed when, at step 314 (shown in FIG. 3), the system recorder 220 determines that the command interrupt is intended for the first block of the NVRAM 224.

As shown in FIG. 4, at step 402, the system recorder 220 determines whether the interrupt command is to read from or write to the NVRAM 224. If the command interrupt is a read command, then at step 404, the system recorder 220 loads the address pointer at the intended address location in NVRAM 224. At step 406, the system recorder 220 reads the intended message from the address location in the NVRAM 224, and forwards the read data to the master device (i.e., device requesting the read operation) in the network. After the read operation is complete, at step 412, the system recorder 220 issues an interrupt return command to return to its idle state at step 302 (shown in FIG. 3).

If at step 402 the system recorder 220 determines that the interrupt command is a write command, then at step 408, the system recorder 220 loads the address pointer at the intended address location in NVRAM 224. The system recorder 220 typically checks on the availability of memory space in NVRAM 224 prior to executing a write operation (see FIG. 6 for details). At step 408, the system recorder 220 writes the event message to the address location in the NVRAM 224, and forwards a confirmation to the master device in the network. After the write operation is complete, at step 412, the system recorder 220 issues an interrupt return command to return to its idle state at step 302 (shown in FIG. 3).

Referring now to FIG. 5, a flow chart is provided for describing the steps of performing a read operation from the second block of the NVRAM 224. As noted above, the second block of the NVRAM 224 is a 64-kbyte memory block. The second block is a memory block which stores event messages in connection with events occurring in the network. Hence, a command addressed to the second block is typically generated by a controller responsible for updating the occurrence of such events. The process described in FIG. 5 is followed when, at step 316 (shown in FIG. 3), the system recorder 220 determines that the interrupt command is a read command intended to be transmitted to the second block of the NVRAM 224.

As shown in FIG. 5, if the system recorder 220 determines that the interrupt command is a read operation, then at step 502, the system recorder 220 loads an address pointer to the intended address in the second block of NVRAM 224. At step 504, the system recorder 220 performs a read operation of the first logged message from the NVRAM 224 commencing with the intended address location. For a read operation, it is preferable that only the 65534 (FFFEh) and 65533 (FFFDh) addresses be recognized. The address 65534 specifies the address of the oldest valid message. The address 65533 specifies the address of the next message following the last message read from the log in NVRAM 224. The last address in the second block of the NVRAM 224 is 65279 (FEFFh). This is also the address at which the system recorder 220 performs a pointer wrap operation (see FIG. 6 for details). In doing so, the system recorder 220 redirects the address pointer to the beginning of the second block of the NVRAM 224. Hence, the address of the next message address after the 65279 address is 0. To perform a read operation of the entire second block in a chronological order, the timestamp is read first. Then, the message logged at address 65534 is read second. This message constitutes the first logged message. Then, the message logged at address 65533 is read next. This message is the next logged message. Then, the message logged at address 65533 is read again to read all subsequently logged messages. The reading at address 65533 terminates until the status field returns a non-zero value.

At step 506, the system recorder 220 determines whether the address location has reached the end of the second block in the NVRAM 224. If the address location has not reached the end of the second block, then at step 508, the system recorder 220 performs a read operation of the next logged message using the addressing scheme described above. The system recorder 220 transmits all read messages to the master device via the I²C bus. If the address location has reached the end of the second block, then at step 510, the system recorder 220 issues an interrupt return command to return to its idle state 302 (shown in FIG. 3).

Referring now to FIG. 6, a flow chart is provided for describing the steps of performing a write operation to the second block of the NVRAM 224. Typically, a command addressed to the second block is generated by a controller (e.g., chassis controller 222) responsible for updating the occurrence of such events. The process described in FIG. 6 is followed when, at step 316 (shown in FIG. 3), the system recorder 220 determines that the interrupt command is a write command directed to the second block of the NVRAM 224.

As shown in FIG. 6, if the system recorder 220 determines that the interrupt command is a write command, then at step 602, the system recorder 220 loads an address pointer to the intended address in the second block of NVRAM 224. At step 604, the system recorder 220 determines whether a memory space is available in the second block of NVRAM 224 to perform the requested write operation. If a memory space is not available in the second block, then at step 606, the system recorder 220 performs a pointer wrap operation. In doing so, the system recorder 220 redirects the address pointer to the beginning of the second block of the NVRAM 224. The system recorder 224 erases the memory space corresponding to a single previously logged message which occupies that memory space. Additional previously logged messages are erased only if more memory space is required to perform the present write operation.

If the system recorder 220 determines that a memory space is available in the second block of the NVRAM 224, then at step 608, the system recorder 220 fetches the time from the real-time clock 221 and stamps (i.e., appends) the real time to the message being written. As noted above, the real time comprises a four-byte field (i.e., 32 bits) which are appended to the message being written. At step 610, the system recorder 220 writes the time-stamped message to the second block of the NVRAM 224. At step 612, the system recorder 220 issues an interrupt return command to return to its idle state 302 (shown in FIG. 3).

Upon the occurrence of a system failure, system maintenance personnel may retrieve the logged event messages in a chronological fashion to identify and trace the events leading up to the time of when such failure occurred. As a result, the system failure is easily repairable with minimal downtime.

In view of the foregoing, it will be appreciated that the invention overcomes the longstanding need for logging and recording the occurrence of information system events leading up to the occurrence of system failures without the disadvantages of having complex failure diagnosis. The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

Appendix A

Incorporation by Reference of Commonly Owned Applications
The following patent applications, commonly owned
and filed October 1, 1997, are hereby incorporated
herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a | 08/942,409 | MNFRAME.049A |

Appendix A-continued

Incorporation by Reference of Commonly Owned Applications
The following patent applications, commonly owned
and filed October 1, 1997, are hereby incorporated
herein in their entirety by reference thereto:

| Title | Application No. | Attorney Docket No. |
|---|---|---|
| Software Generated Pulse Waveform Between Two Servers in a Network" | | |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A system for recording an event occurring in an information processing system having a computer bus, said recording system comprising:
   a system recorder electrically connected to the computer bus;
   a processing unit electrically connected to the computer bus, the processing unit being configured to transmit a message to said system recorder in response to the event; and
   a non-volatile memory unit electrically connected to said system recorder for receiving the message for storage, the memory unit being configured to perform at least one of a read and write operation in a circular sequence, wherein the message comprises a plurality of bits representing at least an address, a least significant bit, a most significant bit, and a status field.

2. The system as defined in claim 1, wherein said system recorder includes a real-time clock for time-stamping said message for storage.

3. The system as defined in claim 1, wherein said memory unit is a non-volatile random access memory (NVRAM) unit.

4. The system as defined in claim 1, wherein said memory unit comprises a plurality of memory blocks, and wherein one block of said plurality of memory blocks stores a device identification code.

5. The system as defined in claim 4, wherein another block of said plurality of memory blocks stores an event message.

6. The system as defined in claim 1, wherein said system recorder supports a read operation from said memory unit.

7. The system as defined in claim 1, wherein the computer bus is an inter-integrated-circuit (I$^2$C) bus.

8. In an information processing system having a plurality of components and experiencing an event, a device comprising:
   a first block that is configured to store information relating to a first-type event associated with one of the plurality of components; and
   a second block that is configured to store information relating to a second-type event associated with one of the plurality of components, wherein the second block is configured to perform at least one of a read and write operation in a circular sequence.

9. The device as defined in claim 8, wherein the information relating to the first-type event comprises at least an identification number.

10. The device as defined in claim 8, wherein the information relating to the second-type event comprises at least an event message of a failure in one of the plurality of components.

11. The device as defined in claim 8, wherein the first-type event relates to a change in the presence of one of the plurality of components.

12. The device as defined in claim 8, wherein the second-type event relates to a failure occurring in one of the plurality of components.

13. The device as defined in claim 8, wherein the size of the first block equals the size of the second block.

14. A system for recording an event occurring in an information processing system having a computer bus, said recording system comprising:
   means for recording information about the event, the recording means being electrically connected to the computer bus;
   means for communicating a message to said recording means in response to the event; and
   means for storing information about the event in a non-volatile manner, wherein the storage means is configured to perform at least one of a read and write operation in a circular sequence, the information comprising a message having a plurality of bits representing at least an address, a least significant bit, a most significant bit, and a status field.

15. The system as defined in claim 14, wherein said recording means includes a real-time clock for time-stamping said message for storage.

16. The system as defined in claim 14, wherein said storage means is a non-volatile random access memory (NVRAM) unit.

17. In an information processing system having a plurality of components and experiencing an event, a device for storing the event comprising:
   a first means for storing the event relating to a first code corresponding to one of the plurality of components; and
   a second means for storing the event relating a second code corresponding to one of the plurality of components.

18. The device as defined in claim , wherein the first code comprises at least an identification number.

19. The device as defined in claim 17, wherein the second code comprises at least an event message of a failure in one of the plurality of components.

20. The device as defined in claim 17, wherein the event relates to a change in the presence of one of the plurality of components.

21. The device as defined in claim 17, wherein the event relates to a failure occurring in one of the plurality of components.

22. A system for recording an event occurring in an information processing system having a computer bus, said recording system comprising:
- a system recorder electrically connected to the computer bus;
- a processing unit electrically connected to the computer bus, wherein said processing unit is configured to transmit a message to said system recorder in response to the event;
- a real-time clock that is electrically connected to the system recorder and configured to time-stamp the message; and
- a non-volatile memory unit electrically connected to said system recorder for receiving the message for storage, wherein the message includes information relating to a failure event represented by a plurality of bits comprising at least an address, a least significant bit, a most significant bit, and a status field, and wherein the memory unit is configured to perform at least one of a read and write operation in a circular sequence.

23. In an information processing system having a plurality of components and experiencing an event, a device comprising:
- a first block that is configured to store information relating to the presence of one the plurality of components; and
- a second block that is configured to store information relating to the failure of one of the plurality of components, wherein the second block is configured to perform at least one of a read and write operation in a circular sequence.

* * * * *

UNITED STATES PATENT AND TRADEMARK OFFICE
CERTIFICATE OF CORRECTION

PATENT NO. : 6,269,412 B1
DATED : July 31, 2001
INVENTOR(S) : Liu et al

It is certified that error appears in the above-identified patent and that said Letters Patent is hereby corrected as shown below:

Column 3,
Line 53, please delete "emobidment" and insert therefor, -- embodiment --.

Signed and Sealed this

First Day of July, 2003

JAMES E. ROGAN
*Director of the United States Patent and Trademark Office*